United States Patent Office 3,436,358
Patented Apr. 1, 1969

3,436,358
REFORMING WITH A NICKEL AND NICKEL OXIDE CATALYST ON A MAGNESIUM-ALUMINATE-SPINEL CONTAINING SUPPORT
Poul Thygesen, Bagsvaerd, Denmark, assignor to Haldor Frederik Axel Topsoe, Hellerup, Denmark
No Drawing. Filed Dec. 16, 1963, Ser. No. 330,531
Claims priority, application Denmark, Dec. 29, 1962, 5,675/62
Int. Cl. B01j *11/22*
U.S. Cl. 252—466
4 Claims

ABSTRACT OF THE DISCLOSURE

The present invention relates to a process of reforming gas mixtures containing hydrogen and carbon monoxide in the gaseous phase by an oxygen-containing gas using a catalyst of the nickel type on a porous carrier or support, the latter at least predominantly or exclusively consisting of MgO and $Al_2O_3$, having in considerable degree a spinel structure and being at least 30% by weight of the support, as well as the catalysts themselves, and methods of making the catalysts, and using them.

---

The present invention relates to a process for the preparation of gas mixtures containing $H_2$ and CO and/or $CO_2$ and, if desired, $N_2$, by reforming in the gaseous phase hydrocarbons or mixtures of hydrocarbons by means of an oxygen-containing gas or gas mixture in the form of carbon dioxide, oxygen, air or preferably steam, or mixtures thereof, using a catalyst of the nickel type on a porous carrier or support. The invention particularly aims at the reforming of saturated and unsaturated aliphatic hydrocarbons having from 1 to 12 carbon atoms, but also aromatic hydrocarbons and naphthenes may be used in the process.

Such processes are known; as starting material is often used natural gas, which is rich in methane, or more or less heavy petroleum fractions, for instance $C_3$ and $C_4$-fractions and gasoline or petrol (benzine) fractions. The purpose of such reformings, which are often performed by means of steam, is partly to produce municipal gas (lighting gas, ordinary town's gas), partly to produce a hydrogen-containing gas for use in the synthesis of methanol, ammonia and other compounds. These processes are markedly endothermic and are performed at relatively high temperatures, for example ranging between 400° C. and about 1400° C.

It should be noted that in such reforming processes there is normally a certain amount of methane present in the output gas-mixture, depending on the reaction conditions, and possibly also other hydrocarbon, especially ethane.

The composition of the output gas-mixture is determined by the equilibrium between the various reactions, of which the principal are:

$$CH_4 + H_2O \rightleftharpoons CO + 3H_2$$
$$CH_4 + 2H_2O \rightleftharpoons CO_2 + 4H_2$$
$$CO + H_2O \rightleftharpoons CO_2 + H_2$$
$$CH_4 + CO_2 \rightleftharpoons 2CO + 2H_2$$

and in an analogous manner for other hydrocarbons.

Already when using methane as raw material in such a reforming process, which has been the most commonly employed starting gas, there is a certain risk that coke is deposited on the catalyst, according to the following reactions:

$$2CO \rightleftharpoons C + CO_2$$

and $$CH_4 \rightleftharpoons C + 2H_2$$

This deposition of coke very soon renders the catalyst useless, whereby the work must be stopped in order to burn clean or even change the catalyst. Furthermore, the deposition of coke causes an undesirable drop of pressure in the reactor to the detriment of the economy of the reforming process.

Still more markedly such a deposition of coke may take place when reforming higher hydrocarbons such as $C_3$ or $C_4$ fractions, benzine fractions or mixtures of hydrocarbons containing unsaturated as well as saturated compositions and/or aromatic hydrocarbons and possibly also naphthenes.

It has been attempted to avoid the deposition of coke among other products by using a considerable excess of steam, but this procedure reduces the economy of the process.

When reforming methane and also higher hydrocarbons, it is known to use a catalyst of the nickel type, i.e., a catalyst consisting of nickel oxide and/or nickel, the oxide presumably having been reduced in a rather high degree to the free metal at the high temperatures and pressures prevailing in the reactor, so that metallic nickel will predominantly constitute the catalytically active material. It is also known to use a catalyst of the cobalt type, or catalysts from other metals, although nickel is generally preferred.

Usually the catalytically active material is placed on a support or carrier, normally a porous support or carrier material. As carrier material it is known to use for instance ceramic and similar materials such as chamotte, kaolin, silicates of magnesium and/or aluminium, or more or less pure oxides of magnesium and aluminium. The materials may for instance be in the form of porous bodies which have been impregnated with the catalytically active material, or the catalytically active material may have been added to the materials before they are formed to bodies.

The known catalysts, in this connection understood as the support with added catalytically active material, in the source of the reforming processes undergo changes which cause a reduction of the catalytical activity and/or a disintegration of the catalyst; these changes are, for example, due to the fact that the system of solid phases of the catalyst at the prevailing high temperatures and possibly by influence of the reducing atmosphere participate in a series of reactions, by which the physical properties as well as the chemical composition of the catalyst may be altered. Moreover, the catalyst is affected mechanically, partly by the influence of the changing temperatures, partly by the wear caused by the gas-mixture flowing through the reactor. Many examples of reactions which take place in materials used as catalysts have been described in literature. Among the principal may be mentioned: an amorphous phase may be converted into a crystalline phase; a crystalline phase may be converted into another crystalline phase; two or more solid phases may react with one another to form one or more different phases; a solid phase may be reduced, in some cases to a volatile compound; in a solid phase crystal growth may take place.

These and possible other reactions will result in a reduced catalytical activity and in some cases in the simultaneous disintegration of the catalyst bodies. The reason for the reduced catalytical activity may for instance be that the pore system of the catalyst and its inner surface are changed unfavourably as a consequence of the said reactions, or that the catalytically active part of the catalyst reacts with the material of the support or carrier. The disintegration of the catalyst bodies may for instance be caused thereby that one or more of the component parts of the catalyst contributing to its mechanical strength are removed by the reduction to volatile compounds.

These difficulties are particularly outspoken in cases where it is necessary to work at high temperatures, for instance at 800–1000° C. or more. Temperatures of such a high range are necessary, partly out of regard to the general economy of the process, partly because the chemical equilibrium in the reactor is displaced in the direction toward a high content of $H_2$ in the output gas mixture at high temperature, which is desirable when producing gases for synthetic use.

A particular difficulty has been encountered when using high temperatures, owing to the fact that silicon-containing materials in a reducing atmosphere liberate silicon in vapour form, probably as SiO, which after reoxidation is deposited as $SiO_2$ in the colder parts of the plant. Thereby an obstruction or choking of pipelines, heat-exchangers and other parts in the reforming plant may occur, and catalysts which are used in subsequent reactions may be poisoned. Moreover, the gaseous SiO will act as a catalyst poison on the reforming catalyst itself, presumably through reaction with nickel under the formation of low-melting silicides, in analogy with the known formation of iron or platinum silicides under similar circumstances.

It has now been found, according to the invention, that all the said disadvantages can be remedied, regardless of the combination of pressure and temperature employed in the reactor, by using in such reforming reactions together with a nickel type catalyst, a catalyst carrier or support in the form of porous bodies impregnated with the catalytically active material, said support predominantly or exclusively consisting of MgO and $Al_2O_3$ having to a considerable degree a spinel structure so that at least 30% by weight of the support is made up of a porous magnesium-aluminium-spinel. Originally, spinel is the name of a mineral, to wit a double oxide of magnesium and aluminum, $MgAl_2O_4$; this double oxide may be synthetically produced, as will be described later on, and particularly the use of a support consisting mainly of synthetic magnesium-aluminum-spinel is aimed at, since it is possible to produce such a support in exteme purity and with a desired pore system suitable for incorporating the catalytically active material in the form of NiO. Spinel is an extremely hard and both chemically and physically very resistant material, having a hardness according to Mohs' scale of about 8, and is therefore well-suited for use in the present reactions, and even under very exacting reaction conditions including a strongly reducing atmosphere, it has no or very small tendency to undergo a reduction which would cause the disintegration of the support.

Besides the original mineral or the corresponding synthetically produced double oxide of Mg and Al, the word spinel is also generally used to denominate double oxides or multiple oxides having the general formula $RQ_2O_4$, in which R represents one or more divalent metals and Q one or more trivalent metals. It is within the scope of the invention that other metals than Mg and Al can form part of the spinel structure; it should be noted, however, that magnesium-aluminium-spinel as far as is known is the most suitable for the purpose in question, that is to say the one which is most resistant to vigorous reaction conditions and especially very high temperatures, so that the catalyst support should at all events contain the said amount of at least 30% by weight thereof. Among the divalent metals which may form part of the spinel structure may be mentioned nickel, cobalt and manganese, and amoung the trivalent metals, manganese, cobalt or chromium. Moreover, the spinel group comprises such multiple oxides in which the trivalent component is partly or totally replaced by equimolar quantities of di- and tetravalent metal components, and the divalent component partly or totally replaced by equimolar quantities of mono- and trivalent metal components. It lies within the scope of the invention to employ a magnesium-aluminium-spinel thus modified, taking into account that the $MgAl_2O_4$ should always represent at least 30% by weight of the support. As examples of monovalent and trivalent metals for partly replacing the divalent component, lithium and/or sodium in combination with aluminum should be mentioned. Examples of possible combinations of tetravalent and divalent metals for partly replacing the trivalent constituent are either of the tetravalent metals titanium, germanium, vanadium and manganese together with magnesium (divalent). In cases where the catalyst should be capable of withstanding vigorous influences, such as high temperatures and pressures, and possibly high gas velocities, the contents of magnesium-aluminium-spinel in the support should be at least 50%, preferably at least 70% by weight.

It has been found that a support material consisting in total or in part of free MgO in noticable quantities will under certain circumstances be decomposed by the hydration of MgO; this decomposition may particularly occur if a condensation of water takes place on the catalyst bodies at high pressure, but also even if the temperature is up to a few hundred degrees centigrade above the dew point of the steam-containing gas mixture.

If the catalyst should be used under such conditions, it should therefore contain more than a few percent of free MgO, and in such cases it is conveniently prepared in such a manner that it contains equimolar amounts of magnesium and aluminium oxide, whereby in practice the conversion into spinel may amount to 96% or even more of the total weight of the support.

Besides, a small amount of free MgO may be of importance in case the catalyst should be capable of resisting an oxidizing atmosphere, as may be the case for instance in a possible regeneration or during cyclical running. It has been found that under such conditions, i.e., an oxidizing atmosphere, the catalytically active material NiO may be dissolved at very elevated temperatures in MgO if the latter is present in the free state in substantial quantities in the support, and such dissolving renders difficult the subsequent reduction to Ni, which is the form in which the nickel preferably exerts its catalytical activity.

Under conditions as the latter, i.e., oxidizing atmosphere, $Al_2O_3$ may also react with NiO to form $NiAl_2O_4$, and catalyst supports which should be capable of withstanding very high temperatures in oxidizing atmosphere should therefore contain only relatively small quantities of free $Al_2O_3$.

As already mentioned, when reforming higher hydrocarbons, for instance benzine fractions, difficulties may occur in the form of deposition of carbon on the catalysts; these difficulties are particularly marked if the hydrocarbon mixture contains substantial amounts of olefins and/or aromates and/or naphthenes. In such cases it is desirable that the catalyst should contain other catalytically active substances than Ni or NiO, or so-called promotors, and it is within the scope of the invention to impregnate the porous catalyst support with such promotors, preferably in the form of an alkali metal oxide, particularly potassium oxide. When using a known catalyst support of the aforesaid types, it may happen that the alkali metal oxide, owing to its relative volatility, reacts with the support material, particularly with silicon contained therein, and this disadvantage is obviated by the use of a catalyst support of the type described; especially, when using a catalyst having a promoter as stated, the support bodies, as well as the catalytically active material and the promotor should essentially be free of silicon; not more than 2% should be present, calculated as $SiO_2$, preferably not more than 0.1% by weight of $SiO_2$, and materials are preferred which contain no analytically traceable silicon whatever.

The invention also comprises the catalyst itself, in the form of porous bodies of a support or carrier having the aforementioned properties, the inner and outer surfaces of said bodies carrying a catalyst of the nickel type (Ni and/or NiO); besides, a promotor may conveniently have been deposited on the said surfaces in the form of an alkali metal oxide, preferably potassium oxide. The amount of nickel and nickel oxide may conveniently represent from 2 to 40, and preferably from 3 to 15% of the total weight of the catalyst bodies, including Ni and NiO. The amount of promotor may vary within wide limits, but is conveniently such that the atomic relation between the alkali metal and nickel is within the limits 1:10 and 1:1.

The catalyst bodies may have the shape of regular bodies or irregular fragments of larger bodies. Bodies having annular or cylindrical shape are preferred. As possible dimensions of the rings may be mentioned for instance an outer diameter from 1 to 4, an inner diameter from 0.4 to 3 and a height from 1 to 4 cm.; cylinders may for instance have a height between 0.4 and 3 cm. and a diameter between 0.4 and 3 cm. Bodies of other shapes, for instance balls, may also be used.

Finally the invention relates to a process for the preparation of the catalyst. According to the invention, this preparation is effected by mixing together substantially pure magnesium oxide and substantially pure aluminium oxide, or substantially pure substances which produce the said compounds when heated, whereafter, if desired, completely combustible additives or auxiliaries are admixed, after which the mixture is formed to bodies of desired shape and size, which for the purpose of totally or partly converting the oxides into spinels are heated to at least 1200° C., after which the porous spinel bodies thus formed are cooled and impregnated with nickel nitrate or another compound forming nickel oxide by calcination; subsequently, the impregnated bodies are heated to calcine the nickel compound. Besides, if desired, the cooled porous nickel bodies may, prior to, simultaneously with or subsequent to the impregnation with the nickel compound, be impregnated with an alkali metal oxide or a compound forming an alkali metal oxide by calcination, preferably potassium nitrate, which may then, at any rate partly, be calcined simultaneously with the nickel nitrate. If the catalyst is to contain such a promotor, the raw materials used should not contain noteworthy quantities of silicon, preferably not more than 0.1% by weight thereof, calculated as $SiO_2$, and most preferably they should be free from analytically traceable silicon.

If the catalyst is not intended to be used under exacting reaction conditions, for example, high temperature or conditions under which formation of hydrates may take place, a content of magnesium-aluminium-spinel of about 50% or less, in many cases as low as 30%, would be satisfactory, in which case the molar ratio between magnesium oxide and aluminium oxide or compounds capable of being calcined to the said oxides present in the raw material mixture may be within the limits 8:2 and 2:8, preferably, however, in the interval between 6:4 and 4:6. Under these circumstances the conversion into spinel may take place at temperatures as low as 1200 to 1300° C. or not much above that, although it is preferred to use temperatures of 1400° C. or higher, suitably about 1450 to 1500° C. If a multiple spinel as previously described should be prepared, oxides or oxide-forming compounds of the other metals desired should be present in the raw material.

In special cases, i.e., when the catalyst should be capable of resisting exacting conditions, for instance high temperatures, and particularly in case it would have to resist alternatingly reducing and oxidizing atmospheres, as it should in the case of cyclical running, the support should most conveniently consist almost exclusively of magnesium-aluminium-spinel, in which case the molar ratio between the magnesium and aluminium compounds in the raw material mixture should range between 4.5:5.5 and 5.5:4.5, preferably even so that the two components are present in the raw material mixture in substantially equimolar quantities. Thereby support or carrier bodies may be formed in which the oxides have been almost entirely converted into spinel, in practice anyhow so that the content of spinel is 96% by weight or more and the content of free MgO and free $Al_2O_3$ thereby becoming quite small. Such a nearly complete conversion into spinel may be effected at temperatures between 1400 and 1500° C., especially outspoken at 1500 to 1600° C.

In the raw material mixture used for the formation of the porous catalyst support, adjuvants or additives may be present which by heating to a high temperature liberate chemically bonded substance in gaseous form, for instance hydroxides, hydrates or carbonates, whereby one obtains more easily a porous structure in the support, such substances liberating water, water of crystallisation or carbon dioxide during the combustion. A special adjuvant or additive may be omitted, however, and the spinel-forming substances themselves may be so chosen as to evolve the said substances in the gas form. For instance, as raw material mixture may be used substantially pure aluminium oxide and substantially pure magnesium hydroxide or carbonate, the porous structure being established by the separation of water or carbon dioxide from the magnesium compound while heating the same. It is also possible to have the raw material mixture consist essentially of pure MgO and essentially pure $Al_2O_3 \cdot 3H_2O$, possibly together with an adjuvant or additional component yielding a gas by being heated. As $Al_2O_3$—$3H_2O$ may conveniently be used the said compound having bayerite structure, or particularly convenient having gibbsite structure (hydrargyllite structure), since especially the latter is produced on a technical scale in extremely pure condition.

During the heating of the bodies formed from the raw material mixture, besides the said liberation of gaseous substances contributing to the development of pore structure, a reaction takes place between the oxides, by which the spinel is formed, depending on the content of spinel-forming metallic compounds either pure Mg-Al-spinel or a multiple spinel. Even if the reaction course is not fully known, it is presumed that a migration of metal ions occurs between the two (or more) oxides, whereas the oxygen part essentially retains its position. The degree of spinel formation may for instance be assessed by X-rays or chemical analysis.

The pore system developing in the catalyst during the heating is distinguished by an extraordinary stability. As previously mentioned, it is possible by means of a suitable choice of starting materials to obtain a pore system having the desired properties, particularly with respect to the distribution of the pore size. It is desirable to have a suitable equilibrium between pores of a relatively small radius and pores of a relatively greater radius.

The calcination of the nickel nitrate, may suitably take place at about 400° C., and at up to 600° C. Sometimes, the complete conversion of the alkali metal oxide-producing compound into the oxide takes place only in the reactor itself after commencing the use of the catalyst, since partly the reducing atmosphere of the reactior and possibly partly the high temperature therein cause the said conversion.

The invention will now be illustrated by some examples, which, however, as not limitative to the scope of the invention.

EXAMPLE 1

A catalyst on a spinel support was prepared in the following way: 16.1 grammes of MgO having a grain-size of 4–40µ (mu, micron), 62.5 grammes of $Al_2O_3 \cdot 3H_2O$ having a gibbsite structure and a grain size of 70–250µ, and 0.79 gramme of magnesium stearate powder were mixed and shaped in a hydraulic press at a specific pressure of 7 tons/cm.$^2$ to cylindrical bodies having a diameter of 9 millimeters and a height of 9 millimeters. During a few hours, the temperature of the bodies was raised to 1450° C., which temperature was maintained for 4 hours. After cooling, the bodies were impregnated with molten $Ni(NO_3)_2 \cdot 6H_2O$ at 80° C. for 1 hour and thereafter heated at 550° C. for 2 hours. Thereby the nickel nitrate was converted to nickel oxide, which represented 12% NiO, calculated on the total weight of the carrier and NiO. The breaking strength of the catalyst was 600 kg./cm.$^2$, measured in axial direction.

At the initial heating the support material was converted into about 70% of spinel, obtaining a total pore volume of 48%, calculated on the volume of the bodies. The pore sizes were distributed in the following manner, equally calculated on the volume of the bodies:

| Pore radius: | Percent |
|---|---|
| 0.05µ–0.3µ | 32.6 |
| 0.3µ–1µ | 7.2 |
| 1µ–2.5µ | 8.3 |
|  | 48.1 |

EXAMPLE 2

The preparation of the catalyst bodies was carried out as described in Example 1, with the difference that $Al_2O_3 \cdot 3H_2O$ of a grain-size of 80µ was used. The total pore volume was 48% vol./vol., having the following distribution:

| Pore radius: | Percent |
|---|---|
| 0.05µ–0.3µ | 34.6 |
| 0.3µ–1µ | 13.6 |
| 1µ–2.5µ | 0.0 |
|  | 48.2 |

EXAMPLE 3

5000 kg. of a catalyst prepared as described in Example 1 were used for the reforming of hydrocarbons at temperatures above 1000° C. in an adiabatic reactor. After having been in operation for 4 months it proved unchanged with respect to physical and chemical properties, where the same quantity of another catalyst, containing about 55% of $SiO_2$ and for the remainder mainly MgO besides NiO, after 4 months had liberated so much $SiO_2$ that the content thereof had been changed to 35%.

A third catalyst containing 3% of $SiO_2$ and for the remainder, besides NiO, mainly $Al_2O_3$, after 4 months had a content of $SiO_2$ of 0.5% and was highly disintegrated.

EXAMPLE 4

This example illustrates the stability of the spinel support at high temperature compared with other support materials. Four catalysts were produced in analogous manners from four different support materials of the following composition:

I. Mainly magnesium silicate,
II. $Al_2O_3$ with 13% of $SiO_2$ in the form of an aluminum silicate,
III. Pure $Al_2O_3$,
IV. Equimolar mixture of MgO and $Al_2O_3$, 70% thereof converted into spinel.

A measured amount of catalyst was placed in an electrically heated tubular reactor and successively exposed to the following treatment: reforming of methane at 985° C.; reforming of methane at 1105° C.; oxidation with steam at 1000° C.; reforming of methane at 985° C.; reforming of methane at 1230° C.; oxidation with steam at 1000°C.; and finally reforming of methane at 985° C. At each of the said methane reformings at 985° C. it was measured how much of the methane quantity introduced in the reactor had been converted to $CO+CO_2$. The results are shown in the table below.

| Support No. | Percent of converted methane | | |
|---|---|---|---|
|  | 1st measurement | 2nd measurement | 3rd measurement |
| I | 49 | 0 | 0 |
| II | 62 | 0 | 0 |
| III | 69 | 58 | 47 |
| IV | 73 | 66 | 61 |

From these results appear clearly the advantages of the silicon-free carrier materials as compared with the silicon-containing ones. Furthermore, the spinel carrier was clearly more stable than the pure $Al_2O_3$-carrier.

I claim:
1. A catalyst for reforming hydrocarbons, and containing as catalytically active material a substance selected from the class consisting of Ni and NiO, said catalytically active material being impregnated in porous bodies of a refractory material at least partly made up of alumina, wherein the improvement comprises the feature that the support predominantly consists of MgO and $Al_2O_3$ being bonded together so as to have a spinel type support structure to such a degree that at least 30% by weight of the support consists of porous magnesium-aluminum-spinel, $MgAl_2O_4$.
2. A catalyst as claimed in claim 1, wherein the amount of nickel oxide makes up 2–40% by weight of the catalyst bodies.
3. A catalyst as claimed in claim 2, in which the amount of nickel and nickel oxide makes up 3–15% by weight of the catalyst bodies.
4. A catalyst as claimed in claim 1, in which at least 50% by weight of the catalyst support consists of porous magnesium-aluminum-spinel.

References Cited
UNITED STATES PATENTS

| | | | |
|---|---|---|---|
| 2,474,440 | 6/1949 | Smith et al. | 252—463 |
| 2,992,191 | 7/1961 | Erickson | 252—465 |
| 3,186,957 | 1/1965 | Stiles | 252—466 |
| 3,216,952 | 11/1965 | Paul et al. | 252—466 |
| 3,216,954 | 11/1965 | Howk et al. | 252—465 |
| 3,271,325 | 9/1966 | Davies et al. | 252—466 |

DANIEL E. WYMAN, *Primary Examiner.*

P. E. KONOPKA, *Assistant Examiner.*

U.S. Cl. X.R.

252—463, 464, 465; 23—212; 48—196, 212, 213, 214, 215